United States Patent [19]

Ayers et al.

[11] 4,223,751

[45] Sep. 23, 1980

[54] HIGH SPEED CAPACITANCE APPARATUS FOR CLASSIFYING PHARMACEUTICAL CAPSULES

[75] Inventors: Joseph W. Ayers, Roseville; Rex C. Wood, New Brighton, both of Minn.

[73] Assignee: Modern Controls, Inc., Elk River, Minn.

[21] Appl. No.: 24,071

[22] Filed: Mar. 26, 1979

[51] Int. Cl.² ............... G01G 3/14; G01G 19/52; B07C 5/344; H01G 5/04
[52] U.S. Cl. .................... 177/210 C; 177/50; 209/571; 209/592; 361/280
[58] Field of Search ............ 177/50, 210 C; 361/280, 361/285; 209/571, 592

[56] References Cited

U.S. PATENT DOCUMENTS

| | | | |
|---|---|---|---|
| 3,469,157 | 9/1969 | Rhodes | 361/280 |
| 3,744,582 | 7/1973 | Withnell et al. | 177/50 |
| 3,944,076 | 3/1976 | Goulds et al. | 209/571 |
| 4,147,618 | 4/1979 | Richardson et al. | 209/592 X |

*Primary Examiner*—George H. Miller, Jr.

*Attorney, Agent, or Firm*—Stuart R. Peterson

[57] ABSTRACT

A dielectric tube, such as glass or plastic, having a square cross section extends between the two plates of a capacitance-sensing transducer. The opposite sides of the tube have a spacing only slightly greater than the diameter of the capsules to be checked. The capsules to be classified are oriented prior to their introduction into the tube so that they enter in an end-to-end relationship. The requisite spacing between the capsules is accomplished by an air jet device that rapidly accelerates the leading capsule as it enters the tube to such a velocity that it leaves the transducer before the next capsule enters, thereby assuring that only one capsule is in the transducer at any given moment. The capacitance-sensing transducer is repeatedly charged and discharged by means of a high frequency oscillator circuit. Capacitance variations from capsule to capsule are measured on a continuous analog basis and logic signals derived from such analog signals are used to determine whether a given capsule should be accepted or rejected. A reject mechanism diverts each bad capsule from the stream of acceptable or good capsules.

25 Claims, 5 Drawing Figures

HIGH SPEED CAPACITANCE APPARATUS FOR CLASSIFYING PHARMACEUTICAL CAPSULES

BACKGROUND OF THE INVENTION

1. Field of the Invention

This invention relates to the high speed weighing of pharmaceutical capsules and the like by checking differences in capacitance as each capsule is propelled between the plates of a capacitive transducer.

2. Description of the Prior Art

Capacitance gauging and weighing, of course, are not new. Gauging techniques of the capacitive type have been used in determining the thickness of various kinds of web stock. The mass of tobacco contained in cigarettes has been measured capacitively. See U.S. Pat. No. 3,979,581, granted on Sept. 7, 1976 to Joachin Revland, for instance.

Even pharmaceutical ingredients have been capacitively weighed. In this regard, U.S. Pat. No. 3,680,650, issued Aug. 1, 1972, to Robert W. Zimmerer, has used the capcitive concept for weighing a powdered pharmaceutical substance which is placed on a balance pan, the movement of a capacitance coupling plate associated with the pan relative to additional capacitor plates producing a signal representative of the weight of the substance. Whereas the weight sensing device in said patent could be utilized capsules, it would be a slow and tedious process and wholly unsuited for the rapid checking of such articles on a continuous and high speed basis.

SUMMARY OF THE INVENTION

An important object of the present invention is to automatically classify pharmaceutical capsules at a very high speed or rapid rate. More specifically, an aim of the invention is to classify on a weight basis small capsules at rates approaching or exceeding twenty-five hundred units per minute.

Another object of the invention is to determine the relative weights of pharmaceutical capsules with sufficient precision so that the capsules will readily meet the high standards demanded in the pharmacology field.

A further object is to provide an immediate rejection of those capsules that do not meet the proper weight requirements.

The invention has for an additional object the facile interfacing of the apparatus with various sorting, counting and control mechanisms or equipment.

Yet another object of the invention is to provide apparatus that requires but few moving parts. Therefore, it is within the purview of our invention to provide apparatus that will be rugged, long lasting and relatively maintenance free.

A still further object of the invention is to provide apparatus that enables all of the capsules to be checked in contrast to present-day techniques where only selected samples or groups of such capsules are spot checked which leaves those that are unchecked vulnerable to error as far as their weights are concerned.

Another object of the invention is to provide a capacitance system for rapidly checking the weight or mass of various pharmaceutical capsules which will be relatively inexpensive to manufacture and operate, particularly when compared with other procedures currently being followed.

Still further, an object of the invention is to properly orient nonconductive objects, particularly elongated or oval pharmaceutical capsules, so that they will always be passed through the transducer in a uniform manner, thereby assuring that a signal indicative of the weight or mass of each capsule is provided and which signal can be readily compared with that expected for a standard capsule, more specifically, those above or below a predetermined weight are easily deflected and removed.

Still another object is to permit the apparatus to be adjusted so that it can process capsules having a different required mass or weight.

Briefly, the invention involves the rapid moving of pharmaceutical capsules or the like through a rapidly changing electric field existing between two parallel plates of a capacitive transducer, and determining, as each capsule moves through the field, the change in capacitance that occurs by reason of the capsule's presence in the field. In this regard, a glass or plastic tube extends between the plates of the capacitive transducer and each capsule is accelerated as it enters one end of the tube by pneumatic propulsion through the field, the air jet impinging on each entering capsule assuring that only a single capsule will be within the transducer at any given time. Inasmuch as pharmaceutical capsules are usually elongated, a device is provided for uniformly orienting the capsules in an end-to-end relation prior to their entrance into the tube that extends through the transducer.

An analog signal is obtained which is related to the measured capacitance change caused by the particular capsule passing through the transducer, and such signal is processed so as to either cause the particular capsule to be accepted or rejected, depending on whether the detected or measured change in capacitance is within specified limits. When the capsule is found to be bad, a rejection mechanism is actuated after an appropriate time interval has elapsed which is sufficient to allow the bad capsule to reach the reject station. The bad or unacceptable capsule is deflected by the rejection mechanism from the path being followed by those that are acceptable.

Portions of the analog signal are utilized from which various control signals are derived for the proper functioning of the overall apparatus.

DESCRIPTION OF THE PREFERRED EMBODIMENT

Figure 1:
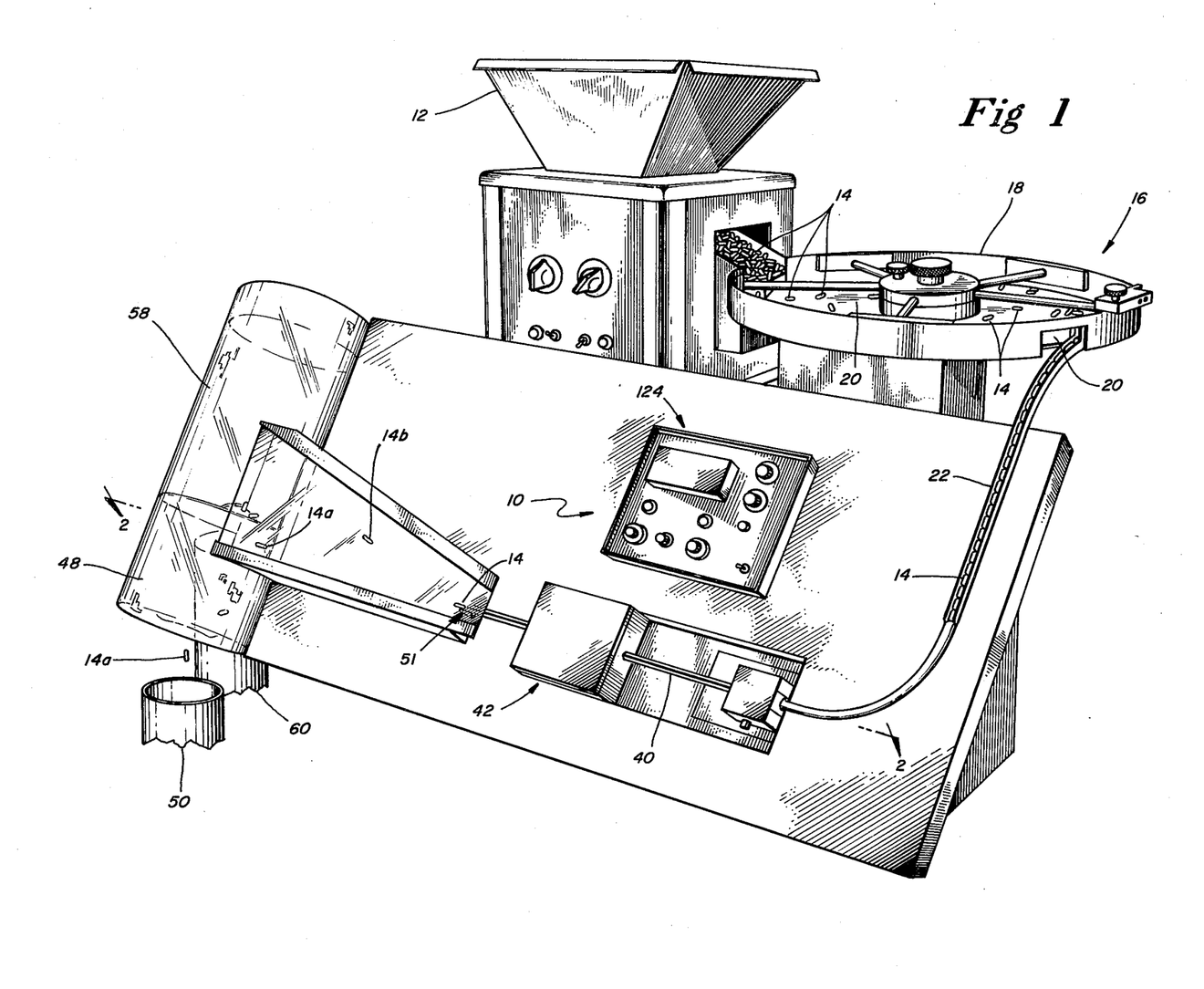
FIG. 1 is a perspective view of apparatus exemplifying our invention.

Referring first to FIG. 1, the apparatus illustrating our invention has been denoted in its entirety by the reference numeral 10. A hopper 12 initially contains a supply of elongated capsules 14 that are to be checked as to whether their respective weights or masses are acceptable. The capsules 14 from the hopper 12 are directed to a conventional vibratory conveyor 16 which includes a circular or disc-like pan 18 having an outlet opening at 20 from which a chute 22 inclines downwardly. It will be appreciated that the vibratory conveyor 18 accepts the various capsules 14 in a randomly oriented condition from the hopper 12, and orients them so that they assume an end-to-end relation by the time they reach the outlet opening 20. The end-to-end orientation can be better understood from those capsules 14 appearing in the lower portion of the chute 22 depicted in FIG. 2.

Figures 2, 3, 5:
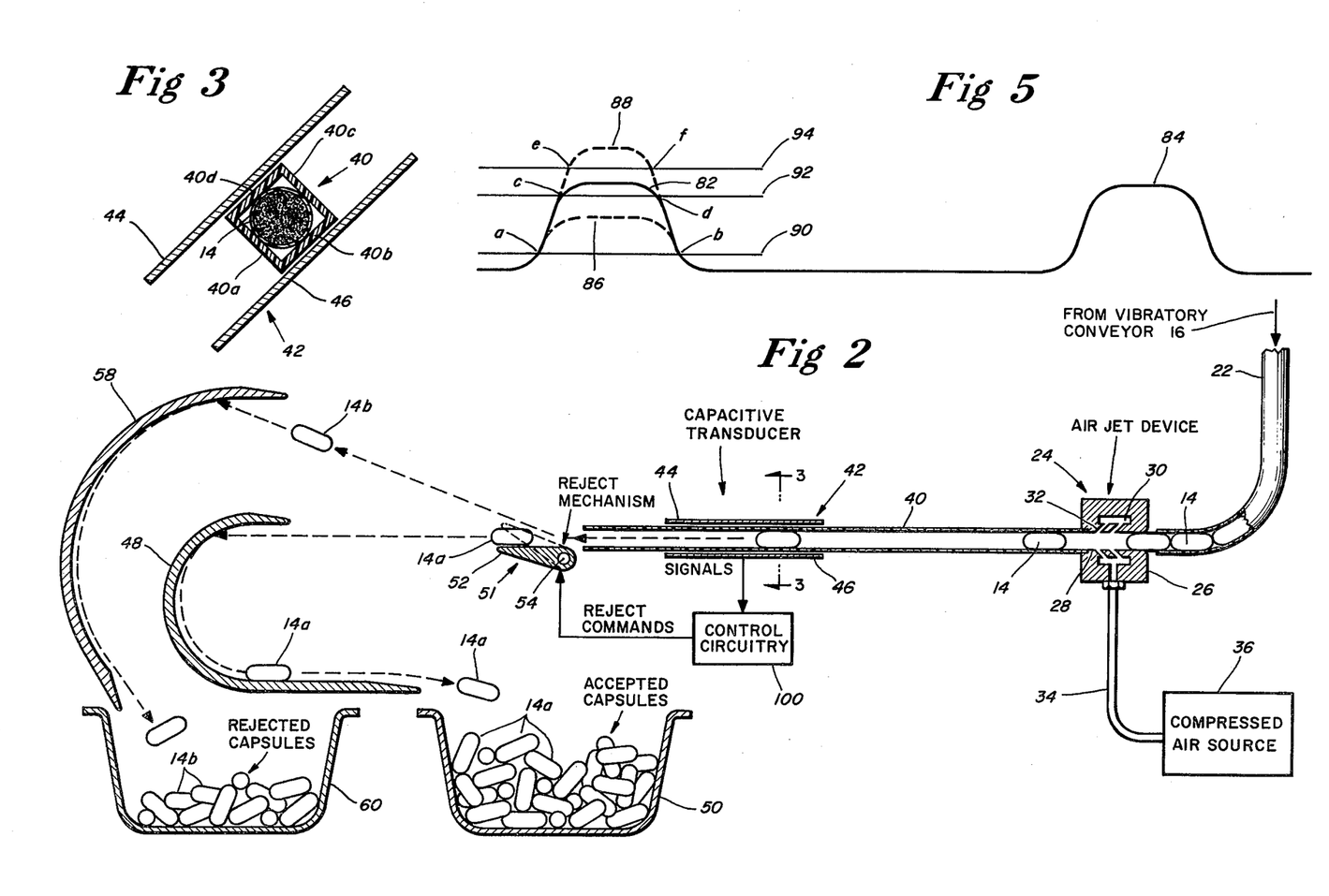
FIG. 2 is a sectional view taken in the plane of line 2—2 of FIG. 1.
FIG. 3 is a sectional detail taken in the direction of line 3—3, the view showing the square cross section of the insulating tube and its relation with respect to the plates of the capacitance sensing transducer.
FIG. 5 shows typical analog signals produced by the passage of two successive capsules through the transducer.

The lower end of the chute 22, as can also be discerned in FIG. 2, is in direct communication with an air jet device 24 for accelerating the various capsules 14 comprising a housing 26 having a central passage 28 extending therethrough. Circumscribing the central passage is an annular manifold 30 with angled nozzle-like passages 32 extending inwardly to the central passage 28 and in the direction that the capsules 14 are intended to be accelerated. The annular manifold 30 is connected via a tube 34 to a source 36 of compressed air.

At this stage of the description, it should be observed that the central passage of the air jet device leads directly into one end of a dielectric tube 40, such as of glass or plastic. Of importance in the practicing of our invention is the cross section of the tube 40. More specifically, the tube 40 has a square cross section, being formed by four sidewalls 40a, 40b, 40c and 40d which reside in four different planes, each of which planes is oriented at an angle of 45 degrees with respect to a vertical plane passing through the lower apex formed at the juncture of the sides 40a, 40b and the upper apex formed at the juncture of the sides 40c, 40d, as can be best understood from FIG. 3. Stated somewhat differently, the tube 40 is angled or partially rotated through 45 degrees about its longitudinal axis so that the sidewalls 40a, 40b form a V-shaped trough for guiding the various capsules 14 in a rectilinear path.

The sidewalls 40a and 40c, and the sidewalls 40b and 40d, are a slightly greater distance apart than the diameter of the capsules 14 that are intended to pass through the tube 40. Thus, the end of the tube 40 connected to the accelerator or air jet device 24 receives the capsules 14 as they are being acted on by the compressed air from the source 36 and are pneumatically conveyed or propelled through the tube 40 from the right end thereof where they enter to the left end thereof when they are discharged.

At this time, attention is directed to a capacitances-ensing transducer 42 comprising a pair of parallel capacitor plates 44 and 46 between which a central portion of the dielectric tube 40 extends. From FIG. 3, it can be seen that the plates 44 and 46 are also angled at 45 degrees with respect to a vertical plane. Actually, the plate 44 is in close proximity with and parallel to the sidewall 40d, whereas the plate 46 is similarly located relative the sidewall 40b. As will hereinafter be explained more fully, the variations in capacitance, as influenced by the movement of a particular capsule therethrough, provides an analog signal related to the capacitance as affected by the presence of a capsule 14 within the confines of the capacitive transducer 42.

By accelerating each capsule 14 as it enters the right end of the tube 40, the entering capsule 14 is rapidly accelerated and quickly separated from the one immediately behind, the spacing thus derived from the air jet impetus assuring that there will be but one capsule 14 in the transducer 42 at any given moment.

When leaving the left end of the plastic tube 40, the capsules 14, if not physically acted upon in a manner presently to be discussed, continue their straight line trajectory. A curved deflector 48 causes the capsules 14a to be directed into a collector or container 50. As will hereinafter be better understood the capsules now labeled 14a are those which are acceptable as to weight.

Inasmuch as the purpose of the invention is to determine which capsules 14 meet the required fill or weight requirements, those capsules that are to be rejected, which will be denoted by the reference numeral 14b, must not be delivered into the container 50. Instead, the invention plans that the capsules 14b be deflected upwardly out of the straight line direction taken by the capsules 14a.

Therefore, a reject mechanism 51 is provided which includes a flipper arm 52 movable into the path or stream of the capsules 14. When actuated or tilted upwardly the arm 52 deflects the capsules 14b upwardly. More specifically, the flipper arm 52 is mounted on an oscillatory shaft 54 belonging to a torque or stepping motor 56. The inclined trajectory imparted to the bad or unacceptable capsules 14b directs them at an upward angle so that they will not strike the deflector 48. The upward deflection of the bad capsules 14b causes them to impinge against a curved deflector 58 and into a container 60. The manner in which the torque motor 56 is controlled will be described hereinafter.

Figure 4:
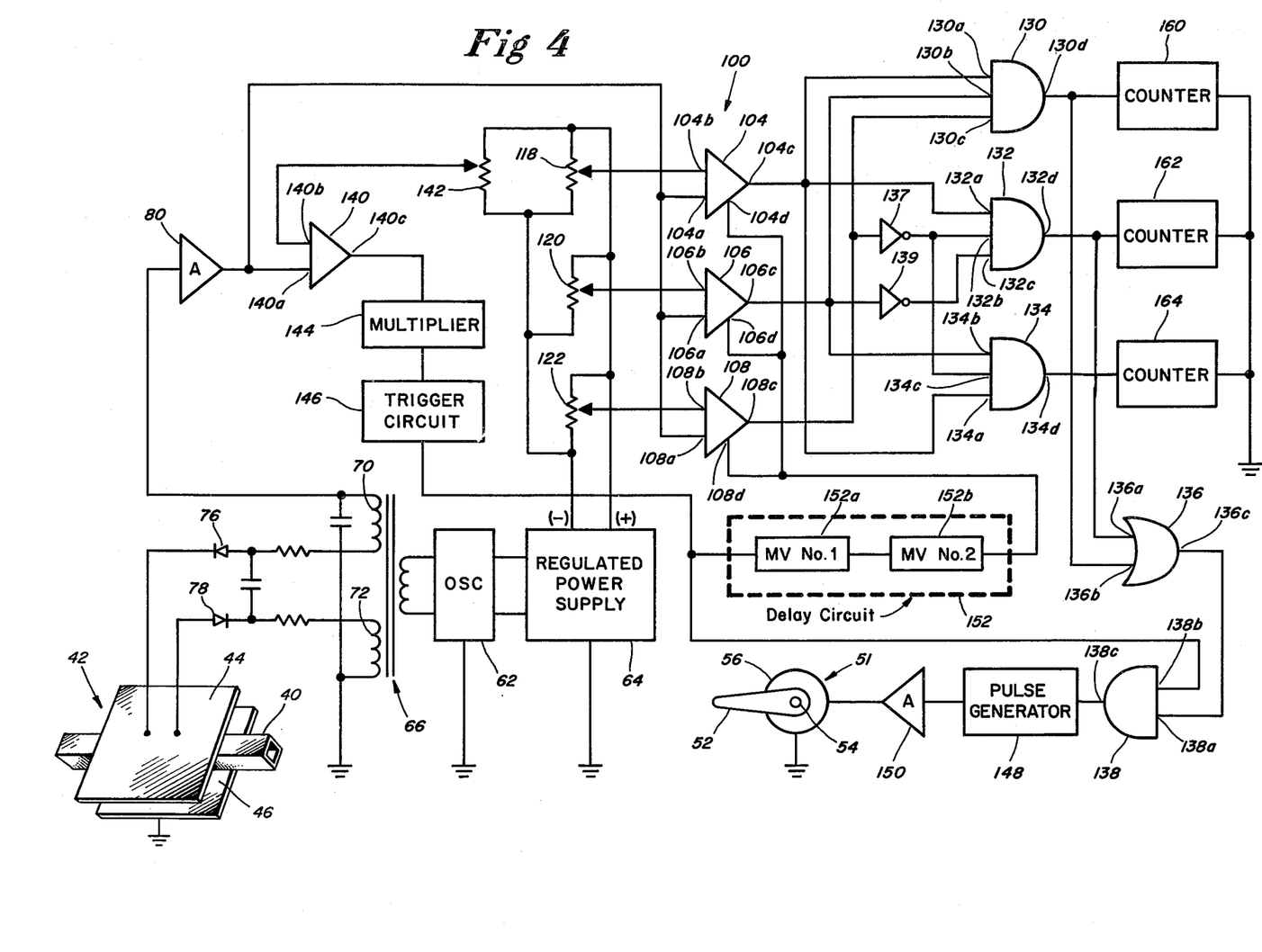
FIG. 4 is a combined schematic and block diagram depicting some of the electrical components used in the practicing of our invention.

In order to energize the capacitance-sensing transducer 42, a push-pull sine wave oscillator 62 is employed. Inasmuch as the oscillator 62 is of conventional design, it is not believed necessary to describe its components and, therefore, has been shown only in block form. It can be pointed out, though, that in actual practice the oscillator 62 is controlled in a manner which assures that the amplitude frequency product generated will thereby remain constant under load variations. In the partial achievement of the foregoing load control, a regulated d-c power supply 64 furnishes power to the oscillator 62. A transformer 66 couples the oscillator 62 to the transducer 42, its primary winding 68 being connected to the oscillator 62 and its two secondary windings 70 and 72 to the capacitor plates 44 and 46 of the transducer 42.

Describing with greater particularity the manner in which the transducer 42 is energized, it will be noted that one side of the secondary winding 70 is connected to its upper plate 44 through a first diode 76, and one side of the winding 72 is connected to the same plate 44 by means of a second diode 78. The other side of the winding 72 is grounded, as is the plate 46 of the transducer 42.

It is important to recognize that the transformer 66 applies sine wave signals of the same amplitude, frequency and phase to the transducer 42, being charged through the first diode 76 as the voltage increases in a positive direction at which time the other diode 78 is reverse biased. However, when the voltage changes polarity, that is goes negative, then the transducer 42 is discharged through the second diode 78. In other words, the transducer 42 is charged and discharged once each cycle, the alternating current variations being rectified by the diodes 76 and 78 into a pulsating direct current. This current is substantially proportional to the capacitance sensed by the transducer 42 and reflects any variations in capacitance caused by the passage of the capsules 14 therethrough.

Although the full circuitry is not depicted in FIG. 4, it will be appreciated that the transducer current flows through the winding 70 to provide an electric signal proportional to transducer current ($V=KI+C$) which signal is applied to one input terminal of an amplifier 80. In actual practice the amplifier 80 is comprised of several amplifying stages. As indicated above, a voltage signal is derived which is proportional to the transducer current. Hence, the signal is proportional, or substantially so, to any capacitance charges produced by the various capsules 14, and, therefore, representative of any changes in the weight or mass of each individual capsule 14 moving through the transducer 42.

Two typical analog voltage signals 82, 84 have been presented in FIG. 5, both denoted by solid lines. However, low and high waveforms or signals 86 and 88, respectively, have been added, these being indicated by broken lines. Detailed reference will be made to the waveforms 82, 86 and 88 at the left. To facilitate the description of what transpires, three horizontal lines 90, 92 and 94 have been superimposed on the waveforms or signals 82, 86 and 88 providing intersection points at a and b, c and d, e and f, respectively, which will be referred to more specifically hereinafter.

It is to be noted that the solid line waveform 82 represents a capacitance that is indicative of a desired or acceptable capsule weight or mass. The dashed or broken line 86 indicates a capsule having too low a weight and thus a capsule that should be rejected. The dashed portion 88 at the top signifies a situation where the weight is too great and the capsule should be rejected. Thus, it will be appreciated that low and high limits can be readily established, the present invention making certain that only those capsules 14 falling within these limits will be directed into the acceptable container 50.

Turning now to the circuitry 100, which permits the acceptance of the analog signal derived from the transducer 42 and which determines whether such a signal corresponds to an under, over or correct weight capsule, it will be seen that the circuitry 100 includes therein three latchable comparator circuits labeled 104, 106 and 108. In this regard, the circuit 104 can be considered to be a "presence" circuit, the circuit 106 a "low" circuit and the circuit 108 a "high" circuit. In actual practice, each comparator 104, 106 and 108 is inhibited or latched under the control of an external signal or command in a manner hereinafter explained. At this time, it will suffice to point out that the latching mode simply signifies that the external or command signal has exceeded the set point for that comparator and that the comparator remembers this until it is unlatched.

The three comparators 104, 106 and 108 are each individually set so that the incoming analog voltage signals from the amplifier 80, which are applied to the several input terminals 104a, 106a and 108a of the comparators 104, 106 and 108, will produce appropriate output signals at the output terminals 104c, 106c and 108c of these three comparators. More specifically, an adjustable potentiometer 118 is used to provide a selected set point at the input terminal 104b of the comparator 104, a potentiometer 120 to provide the set point at the input terminal 106b of the comparator 106, and a potentiometer 122 for applying the appropriate set point to the input terminal 108b of the comparator 108. The potentiometers 118, 120 and 122 are connected in parallel to the earlier-mentioned power supply 64.

The control panel shown in FIG. 1 has been denoted generally by the reference numeral 124 and includes the various knobs for adjusting the potentiometers 118, 120 and 122, as well as monitoring equipment.

Recapitulating somewhat, when a capsule 14 traverses the transducer 42, an analog signal resembling the waveform 82, 86 or 88 is produced. As previously pointed out, the waveform 86 represents a signal having a level that is too low for acceptance, the waveform 82 an acceptable level or good condition of the capsule 14 being checked, and the signal 88 a too high condition which is also not acceptable. Consequently, anything below and above the low and high lines 92 and 94 will cause the particular capsule 14 to be rejected in a manner presently to be described. It is the function of the logic circuitry 100 to decide whether the capsule 14 is too low, good or too high as far as the sensed capacitance of that particular capsule passing through the transducer 42 is concerned. Stated somewhat differently, the logic circuitry 100 decides whether the capsule 14 is good or bad by reason of the trace intersections labeled c, d, e and f.

Stated more specifically, it can be explained that the potentiometer 118 would be adjusted to provide a set point voltage having a very low value, that is only slightly above zero, which would correspond to that voltage represented by the line 90 in FIG. 5. Consequently, when the holding circuit signal 82 (or 86 or 88) reaches and passes point a, the comparator 104 will produce a latched output signal at its terminal 104c. Similarly, the potentiometer 122 would be adjusted to provide a set point voltage having a higher value, which would correspond to the voltage denoted by the line 92 in FIG. 5, with the consequence that when the holding circuit signal 82 (or 88) passes point c, the comparator 106 will provide a latched output signal at its terminal 106c. By the same token, the potentiometer 122 would be adjusted for a set point value still higher in value, such as that indicated by the line 94, so that when the signal 88 increases and passes a level corresponding to point 3, then the comparator 108 will have a latched output signal at its output terminal 108c. It will be appreciated that the specific set points provided by the potentiometers 118, 120 and 122 are determined by the weight or mass criteria for whatever capsules 14 are to be checked. In other words, the potentiometer settings are selected according to the acceptable range or limits for a given group of capsules.

Logic elements 130, 132, 134 and 136 play an important role in determining whether a given capsule 14 is good, bad, high or low based on the signals latched on the output terminals 104c, 106c and 108c of the "presence", "low" and "high" comparators 104, 106 and 108, respectively. The elements 130, 132 and 134 perform AND functions, whereas the element 136 performs an OR function. More specifically, it is to be observed that the output terminal 104c of the comparator 104 is connected directly to one input terminal 130a of the AND logic element 130 and that this same terminal 104c is also connected directly to one input terminal 134a of the element 134. The output terminal 106c is connected directly to the input terminals 130b and 134b of the logic elements 130 and 134, respectively. The output terminal 108c of the comparator 108 is connected directly to the remaining input terminal 130c of the element 130. A first logic inverter 137 is connected between the output terminal 108c of the comparator 108 and a second input terminal 132b of the logic element 132, as well as to the third input terminal 134c of the element B4 whereas a second inverter 139 is similarly connected between the output terminal 106c of the comparator 106 and the third input terminal 132c belonging to the logic element 132. In this way, when there is an output signal from the output terminal 104c of the comparator 104, this signal will be applied to one input terminal of all three logic elements 130, 132 and 134, these input terminals being 130a, 132a and 134a. Such action takes place at point a of FIG. 5. However, there are at this time no output signals from the comparators 106 and 108, for neither c nor e intersections have yet been reached. Owing to the inverters 137 and 139, however, signals are applied to the input terminals 132b and 132c of the AND logic element 132 and also to the input terminal 134c of the logic element 134. Since the output terminal 104c is connected to the input terminal 132a of the logic element 132, it follows that will all three of its input terminals 132a, 132b and 132c enabled, the AND logic element 132 will furnish an output signal at its output terminal 132d. Such signal is delivered from the output terminal 132d to one input terminal 136a of the OR logic element 136. The output terminal 136c of the element 136 is connected to one input terminal 138a of an AND logic element 138, the element 138 being employed for a purpose presently to be explained.

Whereas the signal on the output terminal 136c of the OR logic element 136 denotes that a capsule 14 should be rejected, the reject mechanism 51 should not be actuated until that particular capsule 14 has reached the flipper arm 52. The time, however, will depend upon the velocity of the capsule. The manner in which the energization of the motor 56 is delayed will be described hereinafter.

In this regard, one input terminal 140a of a non-latching comparator 140 is connected to the amplifier 80, and in this way the analog signals, such as 82, 86 and 88, as amplified by the amplifier 80, are delivered to the input 140a of the comparator 140 for a purpose to be explained below.

The function of the comparator 140 is to provide a pulse at its output terminal 140c having a width directly related to the velocity of the particular capsule 14 which is at that time traversing the transducer 42. In furtherance of this objective, the other input terminal 140b of the comparator 140 is connected to the wiper arm of a potentiometer 142 which is in parallel with the previously mentioned potentiometer 118.

The output terminal 140c of the comparator 140 is connected to a pulse stretcher or pulse width multiplier 144 which, as its name indicates "stretches" the output pulse signal from the comparator 140. The "stretched" pulse signal is then delivered to a trigger circuit 146 which produces a spike or trigger pulse at the end of the stretched pulse. The trigger pulse is applied to the other input terminal 138b of the AND gate or logic element 138. The output signal from the output terminal 138c of the element 138 is used for controlling a pulse generator 148. The pulse from the generator 148 is amplified through the agency of an amplifier 150 and the amplified pulse is applied to the torque motor 56. In this way the motor 56 is energized only after a sufficient time interval has elapsed for the capsule 14 to reach the reject mechanism 51. Of course, when there is no output from the OR element 136 then the input terminal 138a has no signal impressed thereon and the pulse generator 148 is not activated with the result that the reject mechanism 51 is not actuated so that the capsule 14 continues on an undeflected course and ends up in the container 50 which collects all good capsules 14a, the bad capsules 14b being deflected and collected in the container 60.

The output terminals of the comparators 130, 132 and 134 may be connected to indicating lamps but in practice are connected to counters 160, 162 and 164 which will indicate the number of high, low and good capsules, respectively.

The trigger circuit, in addition to being connected to the input terminal 138b of the AND element or gate 138, is connected to a delayed pulse circuit 152 comprised of two oneshot multivibrators 152a and 152b which after a given or selected time applies an unlatching pulse to the unlatch terminals 104d, 106d and 108d of the comparators 104, 106 and 108 so as to unlatch these comparators in order that they will be in condition or readied for signals derived from the next or succeeding capsule 14.

The circuitry 100 lends itself readily to other controls and refinements. For instance, there is in actual practice what is called "auto zero circuitry" which is designed to automatically re-zero the transducer driving and processing circuits in order to minimize zero drift which can arise from various sources, such as during a warmup, temperature changes, small mechanical shifts, dust collection and the like. This circuit, although not described herein for simplicity reasons, monitors the analog signal from the amplifier 80 and if the analog signal 82 (or 84, 86, 88) is not at a level or potential that is chosen to indicate a "zero weight" reading, then a voltage is automatically generated and applied to the analog amplifier 80 which forces its output to the chosen zero potential. When the time period is completed, the voltage generated during the "actuate zero" period is stored and continuously applied to the analog amplifier 80 until the next "actuate zero" time period begins. Consequently, after each capsule 14 is classified, the circuitry's zero in actual practice is checked and corrected if necessary. Inasmuch as the actual circuitry involves digital up-down counters fed into a digital to analog converter, the D/A converter output being suitably scaled and fed to the analog amplifier for use on the actual zero control signal, the circuitry becomes sufficiently complex so that it does not warrant a portrayal, as already indicated, as far as the application is concerned. Nonetheless, it should be recognized that the invention is quite versatile and is susceptible to having this refined type of control incorporated therein.

Having presented the foregoing description, the operation of our apparatus 10 is believed to be readily apparent. Nonetheless, in order to appreciate the full advantages and benefits to be derived from a practicing of our invention, a brief operational description will now be given. In this regard, it will be understood from FIG. 1 that when the invention is used to check, that is, provide a weight analysis of pharmaceutical capsules, a supply or plurality of such capsules 14 can be stored in the hopper 12 and are discharged therefrom onto the vibratory conveyor 16 which moves the capsules 14 to the upper end of the downwardly inclined chute 22, orienting them in an end-to-end relationship by the time they reach the opening 20. Thus, when the various capsules 14 start their downward travel from the conveyor 16, they are all uniformly oriented, more specifically, the end-to-end condition that has already been mentioned.

When the end-to-end capsules 14 reach the air jet device 24, they are, for all intents and purposes, touching each other. However, they cannot be fed in this clustered end-to-end relationship through the transducer 42. Therefore, the device 24 accelerates each capsule 14 as it passes the air nozzles 32, this being when each capsule 14 is about to enter the inlet end of the glass or plastic tube 40.

Owing to the square cross section of the tube 40 and its angled relation with respect to a horizontal plane, it can be appreciated that the lower two sides 40a, 40b form a V-shaped groove that guides the capsules 14 in a predetermined rectilinear path through the capacitive transducer 42. As earlier-mentioned, the dimensions of the square cross section tube 40 are selected so that there is very little clearance between the opposite sides 40a, 40c, and 40b, 40d of the plastic tube 40 and the cylindrical configuration of the capsules 14, as can best be appreciated from FIG. 3.

It will be recognized that in order to obtain reliable capacitance measurements for comparison purposes, the axes of the various capsules should be maintained invariant with respect to the direction of the dielectric field between the two plates 44, 46 of the transducer 40. Rotation of any capsule 14 about a line perpendicular to the capacitor plates 44, 46 and translation along this line will result in relatively small errors; however, rotation about other axes will produce relatively large errors which cannot be tolerated. Consequently, the employment of the square cross section plastic tube 40 plays a very important role in achieving a high degree of precision when practicing our invention.

If a given capsule 14 does not provide the requisite capacitance, then a signal is delivered to the circuitry 100 which provides a reject command or reject signal via the circuit 100 to the torque motor 56 which simply flips at the right moment the bad capsule 14b from its straight line path, doing so in an upward direction as can be readily understood from FIG. 2. All other capsules 14a which are not deflected by the flipper arm 52 are directed into the acceptable container 50.

It will be appreciated that the input terminal 140a of the comparator 140 has the voltage 82 (as well as subsequent voltages, such as 84; see FIG. 5) impressed thereon. Since the other input terminal 140b of the comparator 140 has the adjustable voltage from the potentiometer 142 applied thereto, it will be recognized that the resulting signal at the output terminal 140c can be selected to correspond to the level 90 in FIG. 5 with the consequence that the output signal on the terminal 140c will appear at point a of FIG. 5 and will persist until point b is reached. In other words, when the voltage 82 rises to point a, an output pulse will result on the terminal 140c and it remains until the voltage 82 falls to point b. This pulse on the terminal 140c is stretched by the multiplier 144. At the end of the stretched pulse, the trigger circuit 146 produces a spike which is applied to the input terminal 138b of the AND gate or logic element 138 as well as to the input terminal of the delay circuit 152.

If there is currently a signal on the input terminal 138a of the AND gate of logic element 138, then an output signal appears at the output terminal 138c of the gate 138. This causes the pulse generator 148 to step the motor 56 with the result that the flipper arm 52 diverts a capsule 14b (a bad one) from the path of the good or acceptable capsules 14a.

It is to be noted that the OR logic element 136 has a signal on its output terminal 136c when either of its input terminals 136a or 136b is enabled which condition only happens if the particular capsule 14 being capacitively scrutinized has a mass that is too high or too low because, as previously explained, the comparators 106 and 108 provide "low" and "high" capacitively derived output signals with the result that the logic elements 132 130, respectively, reflect such bad or reject signals at their output terminals 132d and 130d.

Although the foregoing is believed adequate for an understanding of how our system functions, it may be of assistance to point out that the wiper arm for the potentiometer 118 would be adjusted so as to provide a set point voltage corresponding to that represented by the line 90 in FIG. 5. Therefore, when the signal 82 reaches that value, then the resulting output signal on the terminal 104c will be impressed on the terminal 132a of the logic element 132. Because there are no signals at the output terminals 106c and 108c under these conditions, the inverters 137 and 139 automatically apply signals to the remaining input terminals 132b and 132c of the element 132. With all three of its input terminals 132a, 132b and 132c enabled, an output signal appears at the output terminal 132d of this element 132 which is also applied to the input terminal 136a of the OR gate 136. This in turn produces a signal at the output terminal 136c which is applied to the input terminal 138a of the element 138. When the other input terminal 138b is energized via the trigger circuit 146, as already explained, then the motor 56 is pulsed or stepped to reject a bad capsule 14b.

On the other hand, with the potentiometer 120 adjusted to provide a set point corresponding to that represented by the line 92 of FIG. 5, then the reject signal derived in the manner just described does not occur if the voltage signal 82 continues to rise to point c.

When point c is reached, an output signal appears at the output terminal 106c of the comparator 106. The inverter 139 under these circumstances removes the signal from the input terminal 132c and with only two of its input terminals, that is 132a and 132b, energized or enabled, it follows that there is no signal at the output terminal 132d and hence no signal impressed on the input terminal 136a of the OR element 136. Consequently, no rejection signal or pulse is delivered to the motor 56 and its flipper arm 52 is not actuated. This allows whatever good capsule 14a to continue without being deflected.

Should the voltage level 94 be reached, owing to the setting of the potentiometer 122, then an output signal is provided on the output terminal 108c of the comparator 108 which is transmitted to the input terminal 130c of the logic element 130. Because of the latched condition of the comparators 104 and 106, the input terminals 130a and 130b are already enabled with the result that a signal is produced at the output terminal 130d, which signal is forwarded to the input terminal 136b of the OR gate 136. This causes a signal to appear at the output terminal 136c and the flipper arm 52 is actuated to reject a capsule 14b having too high a mass in the same fashion as when the input terminal 136a is energized for a capsule 14b having too low a mass.

Of course, it will be recognized that the appearance of a signal at the output terminal 108c removes signals from the input terminals 132b and 134c of the logic elements 132 and 134, respectively, doing so via the inverter 137.

Whereas all of the rejected capsules 14b, both "low" and "high" are diverted into the container 60, nonetheless a tally is obtained as to the respective number of "low" and "high" rejects in that the counter 162 registers a count each time an output signal appears at the terminal 132d, and the counter 160 registers a count each time a signal is produced at the output terminal 130d. By the same token, the counter 164, being connected to the output terminal 134d, counts all of the acceptable capsules 14a.

Consequently, the operator of our apparatus can at any stage ascertain the number of accepted capsules 14a in relation to the number of rejected capsules 14b, and more precisely the number of good capsules 14a in relation to those capsules 14b that possess a mass less than that which is acceptable and in relation to those capsules 14b that are too high as far as their mass is concerned. Not only that but the too "low" and too "high" limits as represented by the lines 92 and 94 can readily be changed as circumstances dictate by adjusting the potentiometers 118, 120 and 122. Likewise, a facile adjustment for a different capsule velocity through the capacitive transducer can be achieved by merely resetting the potentiometer 142.

We claim:

1. Apparatus for checking the relative masses of a plurality of capsules or the like comprising a capacitance-sensing transducer including a pair of spaced capacitor plates, and pneumatic means for individually moving said capsules one at a time between said plates.

2. The apparatus of claim 1 including means for uniformly orienting said capsules prior to introducing said capsules to said moving means, said moving means advancing said capsules between said plates in said uniformly oriented relation.

3. The apparatus of claim 1 including means for providing a signal representative of the capacitance of each capsule, and means responsive to said signal-providing means for rejecting any bad capsule producing a change in capacitance above or below a predetermined value.

4. The apparatus of claim 3 including means for delaying the actuation of said rejection means until a bad capsule has moved from said transducer to said rejecting means.

5. The apparatus of claim 4 in which said delaying means is responsive to the speed of any bad capsule through said transducer.

6. The apparatus of claim 5 in which said signal-providing means furnishes an analog signal, and said delaying means is controlled by threshold points on said analog signal.

7. Apparatus for checking the relative weights of a plurality of capsules comprising a capacitance-sensing transducer including a pair of spaced plates, a tube of dielectric material extending between said plates, means for feeding said capsules in an end-to-end relation into one end of said tube, and means for propelling said capsules one at a time through said tube so that only one capsule is between said plates at any given moment.

8. The apparatus of claim 7 in which said propelling means includes means for directing a jet of air against each capsule at it enters said tube from said feeding means.

9. The apparatus of claim 7 in which said propelling means accelerates each capsule as it enters said tube.

10. The apparatus of claim 9 in which said propelling means includes means for directing air against each capsule to accelerate said capsule and thus separate the capsules passing through said tube so as to cause only one capsule to be between said plate at any given moment.

11. The apparatus of claim 10 including circuit means connected to said plates for providing signals representative of the capacitance produced by each capsule as it passes through said tube and between said plates, and rejection means adjacent the opposite end of said tube controlled by said circuit means for causing those capsules producing a capacitance change, and hence representative of a different weight, above or below a desired value to be diverted from those capsules having a value between said desired values.

12. The apparatus of claim 11 wherein said tube has a non-circular cross section forming a trough for guiding said capsules between said plates.

13. The apparatus of claim 12 in which said tube has a V-shaped bottom forming said trough.

14. The apparatus of claim 12 in which said tube has a square cross section with said tube being disposed so that two sides thereof form said trough.

15. Apparatus for checking the relative weights of elongated capsules comprising a capacitor including a pair of spaced plates, means for charging and discharging said capacitor, means for advancing each capsule between said plates in an end-to-end and sufficiently separated relation so that only a single capsule is between said plates at any given movment, means connected to said plates for providing an electrical analog signal representative of the capacitance of each capsule as it is advanced between said plates, comparator means controlled by portions of said analog signal for providing output signals representative of those capsules which are unacceptable, and means controlled by the output signals from said comparator means for rejecting said unacceptable capsules.

16. The apparatus of claim 15 in which said logic means includes a first AND logic element for producing a signal when a capsule produces a signal indicating that its weight is too low, a second AND logic element for producing a signal when a capsule produces a signal indicating that its weight is too high, and an OR logic element connected to said first and second AND logic elements for producing an output signal whenever either of said AND logic elements produces an output signal, said rejecting means being controlled by said OR logic element.

17. The apparatus of claim 15 including means responsive to threshold levels of said analog signal as said analog signal is first increasing in magnitude and then as said signal is decreasing in magnitude, and means controlled by said threshold responsive means for delaying the actuation of said rejection means in accordance with the time interval between said increasing and decreasing threshold levels and hence the speed of the capsule to be rejected.

18. The apparatus of claim 16 in which said advancing means includes an insulating tube extending between said plates, and an air jet device adjacent the entrance end of said tube for providing said sufficiently spaced relation.

19. Apparatus for checking the relative weights of capsules comprising a capacitive transducer through which said capsules are successively passed, means providing analog signals representative of changes in the capacitance of said capsules and hence changes in the weight thereof, first, second and third comparators each having first and second input terminals and an output terminal, said first input terminals being connected to said analog signal providing means, first, second and third potentiometers, said first potentiometer being connected to the second input terminal of said first comparator for providing a relatively low set point value, said second potentiometer being connected to the second input terminal of said second comparator for providing an intermediate set point value, said third potentiometer being connected to the second input terminal of said third comparator for providing a relatively high set point value, first, second and third AND logic elements each having first, second and third input terminals and an output terminal, said first input terminals of said AND logic elements being connected to the output terminal of said first comparator, a first inverter connected between the output terminal of said second comparator and the second input terminal of said first AND logic element, a second inverter connected between the output terminal of said third comparator and the third input terminal of said first AND logic element, said output terminal of said second comparator also being connected to the second input terminals of said second and third AND logic elements, said third input terminal of said second AND logic element connected to said second inverter between said second inverter and the third input terminal of said first AND logic element, said output terminal of said third comparator also being connected to the third input terminal of said third AND logic element, whereby an output signal appears at the output terminal of said first AND logic element when said analog signal reaches said relatively low set point value, whereby an output signal appears at the output terminal of said second AND logic element when said analog signal reaches said intermediate set point value, and whereby an output signal appears at the output terminal of said third AND logic element when said analog signal reaches said relatively high set point value, and means connected to the output terminals of said first and third AND logic elements for rejecting a capsule as a result of signals appearing on either of the output terminals of said first and third AND logic elements.

20. The apparatus of claim 19 including a fourth comparator having first and second input terminals and an output terminal, said means providing an analog signal being connected to the first input terminal of said fourth comparator, a fourth potentiometer connected to the second input terminal of said fourth comparator for providing a set point having a value indicative of the presence of a capsule in said transducer, and means connected between said output terminal of said fourth comparator and said rejecting means for delaying operation of said rejecting means in accordance with the velocity of said capsules through said transducer.

21. The apparatus of claim 20 in which said means connected between said output terminal of said fourth comparator and said rejecting means includes a multiplier for stretching the signal on said output terminal of said fourth comparator and a trigger circuit connected to said multiplier for providing an enabling pulse for causing actuation of said rejecting means.

22. The apparatus of claim 21 in which said first, second and third comparators are of the latching type, and a delay circuit connected to said trigger circuit and said first, second and third comparators for unlatching said first, second and third comparators.

23. The apparatus of claim 22 including an OR logic element having first and second input terminals and an output terminal, the first input terminal of said OR logic element being connected to the output terminal of said first AND logic element and the second input terminal of said OR logic element being connected to the output terminal of said third AND logic element, and a fourth AND logic element having first and second input terminals and an output terminal, said first input terminal of said fourth AND logic element being connected to the output terminal of said OR logic element and the second input terminal of said fourth AND logic element being connected to said trigger circuit, said output terminal of said fourth AND logic element being connected to said rejecting means.

24. The apparatus of claim 22 in which said rejecting means includes a flipper arm and a stepping motor, and a pulse generator connected between said output terminal of said fourth AND logic element and said motor for energizing said motor to cause actuation of said flipper arm to cause diversion and thus rejection of a capsule.

25. The apparatus of claim 24 including a counter connected to the output terminal of each of said first, second and third AND logic elements.

* * * * *

UNITED STATES PATENT OFFICE
CERTIFICATE OF CORRECTION

Patent No. 4,223,751  Dated September 23, 1980

Inventor(s) Joseph W. Ayers and Rex C. Wood

It is certified that error appears in the above-identified patent and that said Letters Patent are hereby corrected as shown below:

Column 1, line 17, change "Joachin" to -- Joachim --.
Column 1, line 28, after "utilized" insert -- for weighing --.
Column 7, line 1, change "B4" to -- 134 --.
Column 7, line 18, change "will" to -- with --.
Column 13, line 24, after "element" insert -- being --.

Signed and Sealed this

Second Day of June 1981

[SEAL]

Attest:

RENE D. TEGTMEYER

*Attesting Officer*  *Acting Commissioner of Patents and Trademarks*